United States Patent Office 3,193,567
Patented July 6, 1965

3,193,567
ORGANOSILICON COMPOUNDS AND PROCESS
FOR THEIR PREPARATION
Gerd Rossmy, Altendorf (Ruhr), Germany, assignor to
Th. Goldschmidt A.G., Chemische Fabriken, Essen,
Germany, a German corporation
No Drawing. Filed Aug. 22, 1961, Ser. No. 133,040
Claims priority, application Germany, Aug. 30, 1960,
G 30,393; Feb. 27, 1961, G 31,708
30 Claims. (Cl. 260—448.8)

My invention relates generally to organosilicon compounds and is particularly concerned with cyclic and polymeric siloxaalkanes and processes for their preparation.

In recent years, organosilicon compounds, which may be designated as condensation products of silicon compounds having organo-functional hydroxy groups and silanols, have gained importance and recognition to an ever increasing extent. Of particular importance and interest are, in this connection, compounds which may be considered formed from—partly hypothetical—monomolecular organosilicon compounds wherein the Si-atom has attached thereto at least one hydroxy-substituted alkyl group and at least one directly bonded hydroxyl group. Such polyfunctional silicon compounds, by condensation, are capable of forming cyclic compounds

(A)

or polymeric compounds of linear or cyclic structure corresponding to the formula

(B)

In these formulas, M stands for a divalent substituted or unsubstituted hydrocarbon group.

Several processes yielding such compounds have become known in recent years. However, these prior art processes have several serious disadvantages and shortcomings. The primary reason that the prior art processes have not been generally accepted by industry is that the starting materials for these processes are hydroxyalkyl silicon compounds which are not readily available. Further, the hydroxyalkyl silicon compounds which may successfully be utilized in the prior art processes are limited to those species wherein the residual free valences of the silicon atom, as indicated in the Formulas A and B above, are exclusively saturated by or attached to alkyl or trialkylsilylhydroxy groups which are slow to react and are no longer capable of linking.

It is a primary object of my invention to overcome the drawbacks of the prior art processes by providing a novel process for preparing compounds of the kind referred to, wherein readily available starting substances are used, and wherein the hydroxyalkyl silicon compounds which are not readily available are merely formed as intermediates which need not be isolated.

It is also an object of my invention to provide for a process for the preparation of the compounds of the kind referred to, wherein the reaction gives almost quantitative yields.

A still further object of my invention is to provide a process of the kind referred to which permits the incorporation of additional reactive groups linked to the silicon atom.

It is also an object of my invention to provide novel organosilicon compounds which have a wide utility and application for industrial use.

Generally, it is an object of my invention to improve on the art of organosilicon compounds and processes for their preparation as hitherto practiced. The starting materials for carrying out the inventive process are organosilicon compounds of the general formula (C) 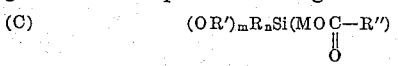

In this formula:

R, R' and R" stand for the same or different substituted or unsubstituted hydrocarbon groups. Such hydrocarbon groups are, for example, $CH_3$, $C_2H_5$, $C_6H_5$, o-$C_6H_4Cl$, 1,3-$C_3H_6CN$ and 1,4-$C_4H_8Cl$;

Generally, R, R' and R" may stand for alkyl, aryl, alkaryl or aralkyl;

M is alkylene with at least two carbon atoms, as for example $C_2H_4$, $C_3H_6$, $C_4H_8$ or 1,3-$C_3H_5Cl$;

$n$ and $m$ are numbers defined by $n=0$–$2$, $m=1$–$3$, and $(n+m)=3$.

Preferred groups for R and $CH_3$ and $C_6H_5$, while $CH_3$ and $C_2H_5$ are preferably chosen for R' and R".

Such silicon compounds may be readily prepared by, for example, forming an addition product of esters of unsaturated alcohols with the corresponding SiH compounds. Such addition may be performed according to well known processes.

It is also within the scope of the inventive process to employ starting compounds of Formula C which have been obtained by first preparing the corresponding halo-silane

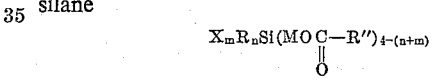

wherein X stands for halogen, preferably Cl, and wherein the other symbols have the above-defined meaning, and thereafter converting this halo-silane into the desired starting compound of Formula C by reaction with an alcohol, preferably in the presence of an acid acceptor as, for example, ammonia, sodium ethylate, triethylamine or pyridine. In many cases it will not be necessary to purify the starting compound as, e.g., by distillation.

According to the inventive process, an alcohol is added to the starting compound of Formula C referred to. In doing so, it is advantageous to choose the alcohol which corresponds to the OR' group of the starting compound.

Moreover, a reesterification catalyst known per se, such as for example, sodium alcoholate, potassium alcoholate, sulfuric acid, HCl, trichloroacetic acid or trifluoracetic acid is added.

For the purpose of initiating the reaction, it is sufficient to add but traces of alcohol. However, in many instances it is advantageous to add a larger excess of alcohol, for example, about 0.1 to 2 moles of alcohol per mole of

group.

The amount of required catalyst is within the same order of magnitude as in other reesterification reactions generally known from organic chemistry, i.e., for example 0.01-5%.

I do not wish to be limited to any theories advanced by me; however, I have reason to believe that the reactions in accordance with the inventive process proceed according to the following formulas:

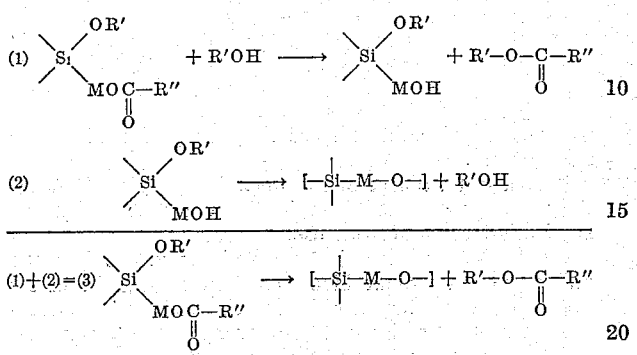

If the alcohol and ester are removed by distillation, then, it may be fairly stated, the reesterification reaction is completed in one single stage, because the organosilicon alcohol

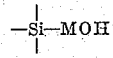

by condensation is continuously withdrawn from the equilibrium condition. A viscous or in some instances solid polymeric mass is obtained as the final product. This mass constitutes the desired condensation product

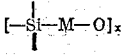

This polymeric reaction product may be purified in exceedingly simple manner by converting it into the cyclic substance

The conversion of the polymeric mass into the readily volatile cyclic substance is easily accomplished by heating to 50–400° C. The conversion into the cyclic substance is facilitated by operating under subatmospheric conditions during the distillation and possibly by the presence of an alkaline or acid catalyst which, of course, is already present in the polymer substance in the form of a residue of the catalyst remaining from the reesterification proper. The amount of such catalyst should preferably be 0.01–5% and generally the same catalyst as during the esterification proper may be used, preferably, however, alkali metal hydroxide or alkali metal alcoholate or alkali silanolate. The cyclic substances obtained in this manner are water-clear liquids of extraordinary reactivity which, in many instances, already during condensation from the vapor state again partly polymerize. Generally, these cyclic substances correspond to the general formula $$(OR')_{m-1}R_nSi(MO)$$

wherein the various symbols have the above given meaning and values.

Very little is known concerning the structural build-up of these polymeric products. In particular, it is not certain which terminal groups limit the linear polymers. It would, of course, suggest itself that such terminal groups are constituted of OR' groups or OH groups which could emanate from alcohol or water traces present in the polymer structure. Many properties of these polymer products tend also to point to higher molecular ring systems.

Polymerization and depolymerization take place without the use of catalysts. Thus, 1-ethoxy-1-methyl-1,2-siloxacyclopentane which polymerized on its own account to high viscous fluids or gels may be distilled without difficulties and without the addition of a catalyst. Depolymerization takes place not only during heating, but also upon dissolution of the polymeric substance in an inert solvent. Such depolymerization may thus be effectively observed by, for example, infrared spectroscopic methods in solvents such as $CS_2$, $CCl_4$, $CHCl_3$ and the like. Thus, for example, for the system of the 1-2-siloxacyclopentane derivatives an intense band at 1035 cm.$^{-1}$ is particularly characteristic for the 5-ring cyclic compound, while the higher molecular units can be easily recognized at a band of 1195 cm.$^{-1}$.

The process hereinbefore described may be carried out in simple manner and gives excellent yields. Nevertheless, in those instances in which the OR' group constitutes the alkoxy residue of an alcohol which is available with difficulty only or which is expensive, the process is not entirely satisfactory as it results in losses of such alcohol.

In further development of the invention, it is therefore preferred in those latter instances first to prepare in accordance with the procedure described above a substance of the formula $$(OR')_{m-1}R_nSi(MO)$$

wherein the OR' group represents a readily available alkoxy group such as methoxy, ethoxy or propoxy, whereafter, in a second step, a reesterification reaction with the more expensive and higher boiling alcohol or phenol R'$^x$OH is performed. In this formula R'$^x$ designates a hydrocarbon which is different from the starting substance wherein, however, R' has the same meaning as in the original starting material. The reesterification reaction is catalytically induced by means of well known catalysts known to chemists skilled in the art as, for example, alkali metal hydroxides, alkali alkoxides, sulfuric acid, trichloroacetic acid or trifluoroacetic acid. Also, the amount of catalyst corresponds to generally known procedures, that is, it will be about 0.01–5% by weight. Sodium or potassium-alcoholate is a particularly preferred and simple catalyst.

The reaction $$(OR')_{m-1}R_nSi(MO) + R'^xOH \rightarrow$$
$$(OR'^x)_{m-1}R_nSi(MO) + R'OH$$

proceeds quantitatively or at least almost quantitatively, while the more volatile R'OH is distilled off. The distillation may be performed through a column. The compound obtained by the reesterification may be readily purified by distillation in its cyclic form.

The inventive cyclic or polymeric liquids lend themselves particularly well to reactions with isocyanates, with alkyd resins for the preparation of mixed resins, with carboxylic acids for the production of acylhydroxyalkyl-substituted siloxanes or for the preparation of modified silicon polymers. However, this does not limit the use of the inventive compounds as, for example, they may be incorporated or built in a very simple manner into other organosiloxanes while using known equilibration catalysts.

If the compounds are reacted with $SO_3$ or sulfuric acid, water soluble silicon-organic sulfuric acid esters are obtained.

The invention will now be described by several examples, it being understood, however, that these examples are given by way of illustration and not by way of limitation, and that many changes and alterations may be effected in choice of, e.g. starting materials and process conditions in general, without departing in any way from the scope and spirit of this invention as recited in the appended claims.

EXAMPLE 1

6450 grams of γ-acetoxypropylmethyldichlorosilane were added in dropwise manner to a mixture comprising 10 liters of benzene and 3040 grams of ethanol. The mixture was saturated with ammonia and during the dropwise addition of the silane compound, ammonia was constantly introduced into the well-stirred reaction mixture. Ammonium chloride precipitated, was filtered off and dissolved in water. In doing so, a layer of ethoxysilane separated, which was taken up with a small amount of benzene, was dried and thereafter added to the filtrate. Upon removal of the benzene by distillation, the γ-acetoxypropylmethyldiethoxysilane formed could be recovered in pure form by means of fractional distillation. 6550 grams, which corresponds to about 94% of the theoretical amount, distilled at 13 mm. Hg between 108 and 112° C. The other alkoxysilanes mentioned in the subsequent examples could be recovered in analogous manner with similar yields. 4680 grams of the compound γ-acetoxypropylmethyldiethoxysilane thus obtained were admixed with 460 grams of anhydrous ethanol and 10 grams of sodium and the mixture was left to stand over night. The ethylacetate which was formed and excess alcohol were removed by distillation, and the reesterification process was thereafter repeated once more with a further amount of 460 grams of ethanol. The ethylacetate-ethanol mixture was separated whereupon the remainder was subjected to distillation at 150–170° C. whereby 2730 grams of a liquid were obtained which corresponded to about 94% of the theoretical amount. This liquid was subjected to infrared spectroscopic analysis which clearly indicated that it consisted of 1-methyl-1 - ethoxy - 1,2 - siloxacyclopentane comprising a small amount of methyltriethoxysilane. This liquid, upon standing, became more viscous to change over into its polymeric chain-like state. Upon fractional distillation through a column of 30 cm. length which was filled with filling bodies, the main portion, i.e. more than 90%, distilled between 159 and 162° C. Infrared spectroscopic determination clearly indicated the absence of methyltriethoxysilane after the distillation. The spectrum of the gaseous substance exhibited, in addition to the known absorptions characteristic for the Si—$CH_3$ and the Si—$OC_2H_5$ groups, a very characteristic intense band at 1035 cm.$^{-1}$ for the 1-2-siloxacyclopentane ring. A test sample which was freshly distilled and which had been separated at —70° C. was subjected to cryoscopic molecular weight determination which indicated the value 160, while the theoretical value for the cyclic monomeric substance is 146. A portion of the substance was in crystalline form at —70° C. Elementary analysis yielded the following values:

| Analysis | Actual | Theoretical |
| --- | --- | --- |
| Si | 18.9% | (19.2%) |
| C | 49.0% | (49.3%) |
| H | 9.9% | (9.65%) |
| $OC_2H_5$ | 30.6% | (30.8%) |

The liquid rapidly polymerized upon heating to room temperature. After standing for 15 days at 20° C., the viscosity increased, for example, to 55 cp. The polymerization may be considerably accelerated to a certain optimum point by traces of moisture, alcohol, acids, Friedel-Crafts catalysts, many other metal salts and higher temperatures. The polymerization may be constantly interpreted and its course may be checked and observed. This may be done by means of the viscosity and the infrared spectrums which will show an increase of the band at 1195 cm.$^{-1}$ and a decrease of the band at 1035 cm.$^{-1}$. In this manner, liquids having a viscosity of several thousand cp. may be readily prepared. Even samples which have already solidified into gel form may be readily depolymerized upon heating to temperatures in excess of about 160° C. and may then be distilled in the form of the monomeric cyclic compound.

The operating method described hereinabove was applied in analogous manner to other alkoxysilanes as disclosed in the following examples. The operating and process conditions, however, could be varied within broad limits with regard to the amounts of alkali metal and alcohol, as well as concerning the reesterification temperature, without there being observed significant changes in the reaction course. The yields were throughout almost quantitative. For the purpose of avoiding side reactions, it was, however, in some instances advantageous to employ very small alkali and alcohol amounts and to neutralize the alkali catalyst prior to the distillation of the cyclic compound. Such undesired side reactions would cause a splitting of the Si—$(CH_2)_3$ bond.

In the following examples, the alcohol and alkali amounts per mole of ethoxysilane as well as the reesterification temperature are indicated in each separate case.

The structure of the compounds obtained was confirmed in each case by elementary analysis and infrared spectroscopic measurements. With regard to the polymerization, all the 1,2-siloxacyclopentanes prepared exhibited in principle a behavior corresponding to that of 1-methyl-1-ethoxy-1,2-siloxacyclopentane.

EXAMPLE 2

*Preparation of 1-methoxy-1-methyl-1,2-siloxacyclopentane*

Quantities of starting materials:

1 mole of γ-acetoxypropylmethyldimethoxysilane
1 mole of methanol
0.6 gram of sodium The reesterification was carried out at room temperature. Yield: 90%. Boiling temperature: 165–166° C.

| Analysis | Actual | Theoretical |
| --- | --- | --- |
| Si | 21.2% | (21.2%) |
| C | 44.9% | (45.4%) |
| H | 8.9% | (9.15%) |
| $OCH_3$ | 24.4% | (23.5%) |

EXAMPLE 3

*Preparation of 1-n-propoxy-1-methyl-1,2-siloxacyclopentane*

Quantities of starting materials:

1 mole of alkoxysilane
0.7 mole of n-propanol
0.5 gram of potassium

The reesterification was carried out at 50° C. Yield: 86%. Boiling temperature: 177–181° C.

| Analysis | Actual | Theoretical |
| --- | --- | --- |
| Si | 17.3% | (17.5%) |
| C | 52.5% | (52.5%) |
| H | 10.0% | (10.1%) |
| $OC_3H_7$ | 37.0% | (36.9%) |

EXAMPLE 4

*Preparation of 1-i-butoxy-1-methyl-1,2, siloxacyclopentane*

Quantities of starting materials:

1 mole of alkoxysilane
1 mole of i-butanol
0.7 gram of sodium

The reesterification was carried out at room temperature. Yield: 94%. Boiling temperature: 187–193° C.

| Analysis | Actual | Theoretical |
| --- | --- | --- |
| Si | 15.9% | (16.3%) |
| C | 54.8% | (55.8%) |
| H | 10.4% | (9.4%) |

EXAMPLE 5

*Preparation of 1-cyclohexoxy-1-methyl-1,2-siloxacyclopentane*

Quantities of starting materials:

1 mole of alkoxysilane
1 mole of cyclohexanol
0.6 gram of sodium

The reesterification was carried out at room temperature. Yield: 85%. Boiling temperature: 235–240° C.

| Analysis | Actual | Theoretical |
|---|---|---|
| Si | 14.0% | (14.0%) |
| C | 58.1% | (59.9%) |
| H | 9.9% | (10.1%) |

A portion of the substance crystallized upon standing. Cryoscopic determination indicated a mole weight of 315. The deviation from the theoretical value for the monomeric cyclic compound can be explained by partial polymerization upon dissolution.

EXAMPLE 6

*Preparation of 1-phenyl-1-ethoxy-1,2-siloxacyclopentane*

Quantities of starting materials:

1 mole of ethoxysilane
1 mole of ethanol
0.9 gram of sodium

The reesterification was carried out at room temperature. Yield: 78%. Boiling temperature: 250–262° C.

| Analysis | Actual | Theoretical |
|---|---|---|
| Si | 12.15% | (13.47%) |
| C | 60.9% | (63.5%) |
| H | 8.04% | (7.74%) |
| $OC_2H_5$ | 26.1% | (21.62%) |

EXAMPLE 7

*Preparation of 1-1-diethoxy-1,2-siloxacyclopentane*

Quantities of starting materials:

1 mole of alkoxysilane
0.7 mole of alcohol
1 gram of sodium

The reesterification was carried out at room temperature.

Prior to the distillation of the cyclic substance, the alkali was neutralized with acetic acid. Yield: 90%. Boiling temperature: 225–230° C.

| Analysis | Actual | Theoretical |
|---|---|---|
| Si | 15.2% | (15.9%) |
| C | 47.1% | (47.7%) |
| H | 9.3% | (9.14%) |
| $OC_2H_5$ | 50.8% | (51.1%) |

EXAMPLE 8

*Preparation of 1,1-dimethyl-1,2-siloxacyclopentane*

The quantities of starting materials were the same as in Example 1. Reesterification was carried out at room temperature. Yield: 91%. Boiling temperature: 109–113° C.

| Analysis | Actual | Theoretical |
|---|---|---|
| Si | 23.2% | (24.2%) |
| C | 50.9% | (51.7%) |
| H | 10.45% | (10.4%) |

EXAMPLE 9

*Preparation of 1-methyl-1-ethoxy-1,2-siloxacyclohexane*

Quantities of starting materials:

1 mole of alkoxysilane
2 moles of ethanol
1.6 grams of sodium

The reesterification was carried out for one hour at 80° C. Yield: 95%. Boiling temperature: 165–173° C.

| Analysis | Actual | Theoretical |
|---|---|---|
| Si | 17.2% | (17.5%) |
| C | 52.3% | (52.5%) |
| H | 10.0% | (10.1%) |
| $OC_2H_5$ | 28.4% | (28.1%) |

In contrast to the siloxacyclopentane derivatives, the substance did not polymerize upon simple standing.

EXAMPLE 10

*Preparation of 1-methyl-1-phenoxy-1,2-siloxacyclopentane*

1 mole of 1-methyl-1-ethoxy-1,2-siloxyclopentane in predominantly polymeric form, 1.1 mole of phenol and 1 gram of sodium were mixed and heated in a flask connected with a column. 43 grams of ethanol distilled over, which corresponds to about 93% of the theory. The residue could be distilled at temperatures up to 260° C. In doing so, 185 parts by weight distilled, which corresponds to about 93% of the theory. The bulk distilled after repeated fractional distillation between 255 and 257° C.

| Analysis | Actual | Theoretical |
|---|---|---|
| Si | 14.3% | (14.45%) |
| C | 60.2% | (61.8%) |
| H | 6.9% | (7.3%) |

EXAMPLE 11

The reesterification reaction described in Example 10 was performed in analogous manner with diethylenegylcolmonomethylether. 1,2'-(-2''-methoxyethoxy)-ethoxy-1-methyl-1,2-siloxacyclopentane was obtained in a yield of about 75%. Boiling temperature: 115–140° C., 0.2 mm.

| Analysis | Actual | Theoretical |
|---|---|---|
| Si | 12.5% | (12.5%) |
| C | 48.1% | (48.25%) |
| H | 9.3% | (9.0%) |

EXAMPLE 12

*Preparation of 1-n-octoxy-1-methyl-1,2-siloxacyclopentane*

The reesterification described in Example 10 was carried out in analogous manner with n-octanol. After expelling the ethanol, the residue distilled at 140–155° C. at 11 mm. Hg. The product obtained solidified into a wax-like mass upon cooling.

| Analysis | Actual | Theoretical |
|---|---|---|
| Si | 12.0% | (12.2%) |
| C | 60.8% | (62.5%) |
| H | 11.2% | (12.2%) |

EXAMPLE 13

1 mole of 1-methyl-1-ethoxy-1,2-siloxacyclopentane in predominantly polymeric form was heated with 1 mole of glycol and 0.4 gram of sodium. In doing so, 1 mole of ethanol distilled. The residue was a viscous liquid. The infrared spectrum indicated the presence of

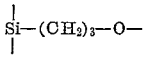

chains and hydroxyl groups.

EXAMPLE 14

*Preparation of 1-trimethylsiloxy-1-methyl-1,2-siloxacyclopentane*

1 mole of 1-methyl-1-ethoxy-1,2-siloxacyclopentane in predominantly polymeric form was heated under reflux with 1.5 moles of hexamethyldisiloxane and 2 ml. of sulfuric acid. Trimethylethoxysilane was distilled off through a column. The residue was neutralized with a benzene suspension of sodium ethylate, whereafter it was subjected to distillation. At a temperature of 140–175° C., 143 grams distilled, which corresponds to about 75% of the theory. Upon repeated fractional distillation, the bulk distilled at 155–165° C.

| Analysis | Actual | Theoretical |
|---|---|---|
| Si | 29.4% | (29.5%) |
| C | 43.6% | (44.2%) |
| H | 9.8% | (9.5%) |

Also the previously described propoxy-, butoxy- and hexoxy- derivatives of 1-methyl-1,2-siloxacyclopentanes can be prepared by reesterification from 1-methyl-1-ethoxy(methoxy)-1,2-siloxacyclopentane in simple manner.

EXAMPLE 15

Within 5 hours a solution of 1 gram of potassium in 46 grams of ethanol was introduced in drop-wise manner at a temperature of 105° C. into 234 grams of γ-acetoxypropylmethyldiethoxysilane. Upon vigorously stirring besides ethanol 97% of the theoretical amount of ethylacetate distilled off. Thereafter the residue was freed from the catalyst by filtration and was distilled at 25 torr in a vaporizer working with a thin layer being heated to 150° C. 136 grams (93% of the theoretical amount) of 1-methyl-1-ethoxy-1,2-siloxacyclopentane were obtained as a distillate.

What I claim is:

1. Organosilicon compounds of the unit formula

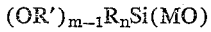

wherein R and R' stand for hydrocarbon groups; M is selected from the group consisting of alkylene and 1,3-$C_3H_5Cl$; and $n$ and $m$ are numbers defined by $n=0-1$
$m=2-3$,
$m+n=3$.

2. Organosilicon compounds of the unit formula

wherein R and R' are each members selected from the group consisting of alkyl, aryl, alkaryl, o-$C_6H_4Cl$, 1,3-$C_3H_6CN$, 1,4-$C_4H_8Cl$ and aralkyl; M is selected from the group consisting of alkylene and 1,3-$C_3H_5Cl$, and $n=0-1$,
$m=2-3$,
$n+m=3$.

3. Organosilicon compounds as set forth in claim 2, wherein at least one of R and R' is $CH_3$.

4. Organosilicon compounds as set forth in claim 2, wherein at least one of said R and R' is $C_2H_5$.

5. Organosilicon compounds as set forth in claim 2, wherein at least one of said R and R' is $C_6H_5$.

6. Organosilicon compounds as set forth in claim 2, wherein the compounds are in their monomeric cyclic form comprising a single Si-atom.

7. Organosilicon compounds as set forth in claim 2, wherein the compounds are in their polymeric form comprising at least two Si-atoms.

8. Organosilicon compounds of the unit formula

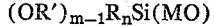

wherein R and R' stand for lower alkyl; M stands for $(CH_2)_x$ wherein $x=3-4$; and $n$ and $m$ are numbers defined by $n=0-1$,
$m=2-3$, and
$n+m=3$.

9. Organosilicon compounds of the unit formula

wherein R is $CH_3$; R' is lower alkyl; M is $(CH_2)_3$; and $n$ and $m$ are numbers defined by $n=0-1$,
$m=2-3$, and
$(n+m)=3$.

10. Organosilicon compounds of the unit formula

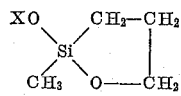

wherein X is alkyl.

11. Organosilicon compounds of the unit formula

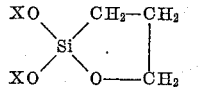

wherein X is alkyl.

12. A process for the preparation of organosilicon compounds of the unit formula

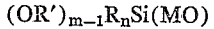

wherein R and R' are each selected from the group consisting of alkyl, aryl, alkaryl, o-$C_6H_4Cl$, 1,3-$C_3H_6CN$, 1,4-$C_4H_8Cl$ and aralkyl; M is selected from the group consisting of alkylene and 1,3-$C_3H_5Cl$; and $n$ and $m$ are numbers defined by $n=0-2$,
$m=1-3$, and
$n+m=3$ which comprises admixing organosilicon compounds of the formula

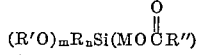

wherein R" is selected from the group consisting of alkyl, aryl, alkaryl and aralkyl and the other symbols have the above defined meaning, with an alcohol of the formula R'OH and a reesterification catalyst, and separating the resulting ester R"COOR' and the excess amounts of the alcohol R'OH by distillation.

13. A process as claimed in claim 12, wherein said compound

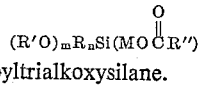

is a γ-acetoxypropyltrialkoxysilane.

14. A process as claimed in claim 12, wherein said compound

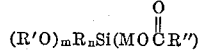

is a γ-acetoxypropylmethyldialkoxysilane.

15. A process as claimed in claim 12, wherein said reesterification catalyst is an alkali metal alcoholate.

16. A process as claimed in claim 12, wherein the organosilicon reaction product is first obtained as a high-molecular polymer and is thereafter depolymerized by heating it to about 50–400° C. to obtain a monomeric product.

17. A process as claimed in claim 16, wherein the monomeric product is distilled to obtain a cyclic product comprising a single Si-atom.

18. A process as claimed in claim 17, wherein said distillation is carried out under subatmospheric pressure conditions.

19. A process as claimed in claim 17, wherein said distillation is carried out in the presence of a depolymerization catalyst.

20. A process as claimed in claim 19, wherein said depolymerization catalyst is the same as the catalyst employed as the re-esterification catalyst.

21. A process as claimed in claim 12, wherein the reaction product of unit formula

is reacted with a compound R'OH whose boiling point is higher than the boiling point of the alcohol corresponding to the OR'— group of the above formula, said reaction being carried out in the presence of a reesterification catalyst, and removing the lower boiling alcohol by distillation.

22. A process as claimed in claim 21, wherein said catalyst is an alkali metal alcoholate.

23. A process as claimed in claim 21, wherein the reaction product obtained after said distillation is depolymerized by heating it to about 50–400° C.

24. A process as claimed in claim 21, wherein the reaction product obtained after said distillation is depolymerized by heating it to about 50–400° C. and is then distilled to obtain a cyclic product comprising a single Si-atom.

25. Organosilicon compounds of the unit formula

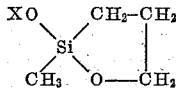

wherein X is aryl.

26. Organosilicon compounds of the unit formula

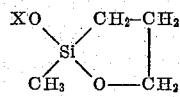

wherein X is 2-methoxyethyl.

27. Organosilicon compounds of the unit formula

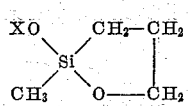

wherein X is 2-(2'-methoxyethoxy)-ethyl.

28. Organosilicon compounds of the unit formula

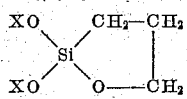

wherein X is aryl.

29. Organosilicon compounds of the unit formula

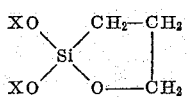

wherein X is 2-methoxyethyl.

30. Organosilicon compounds of the unit formula

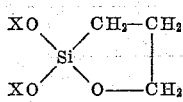

wherein X is 2-(2'-methoxyethoxy)-ethyl.

References Cited by the Examiner

UNITED STATES PATENTS

| | | | |
|---|---|---|---|
| 2,276,094 | 3/42 | Rothrock | 260—448.8 |
| 2,872,434 | 2/59 | Barnes | 260—448.8 |
| 2,888,454 | 5/59 | Bailey | 260—448.8 |
| 2,909,551 | 10/59 | Shibe | 260—448.8 |
| 2,983,744 | 5/61 | Knoth | 260—448.8 |
| 2,983,745 | 5/61 | Speier | 260—448.8 |

OTHER REFERENCES

Speier: "Jour. Am. Chem. Soc.," vol. 74 (1952), pp. 1,003–10.

TOBIAS E. LEVOW, *Primary Examiner.*

ALPHONSO D. SULLIVAN, SAMUEL H. BLECH,
*Examiners.*